Nov. 2, 1926.  
W. F. LANGELIER  
1,605,596  
PROCESS OF CLARIFYING TURBID WATER OR OTHER LIQUIDS  
Filed May 17, 1923
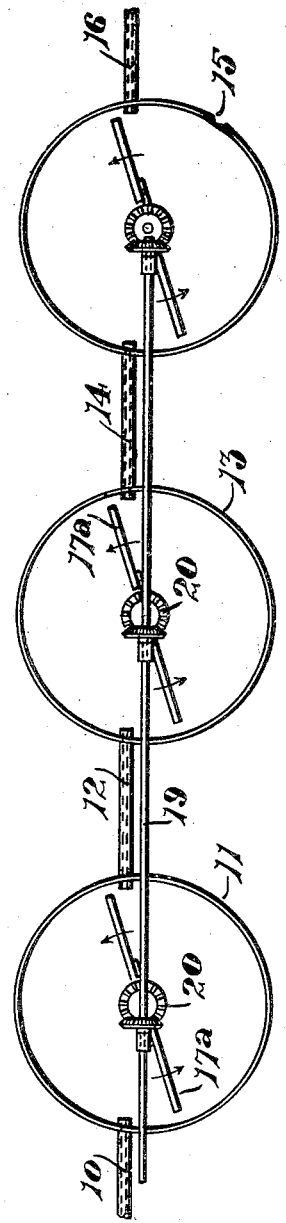
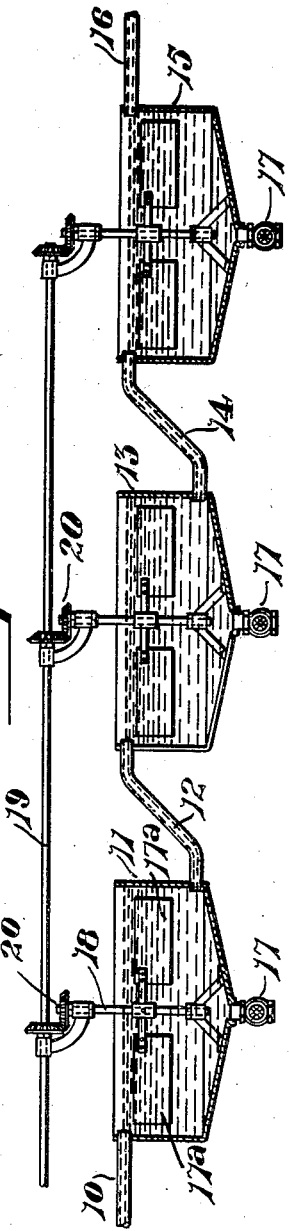
INVENTOR.  
WILFRED F. LANGELIER  
BY  
ATTORNEYS.

Patented Nov. 2, 1926.

1,605,596

UNITED STATES PATENT OFFICE.

WILFRED F. LANGELIER, OF BERKELEY, CALIFORNIA.

PROCESS OF CLARIFYING TURBID WATER OR OTHER LIQUIDS.

Application filed May 17, 1923. Serial No. 639,482.

This invention relates to a method of purification and clarification of water, sewage and other liquids, wherein the use of a coagulant is provided.

At the present time it is common practice in the chemical filtration and clarification of impure liquids to mix a desired percentage of a coagulant such as alum, lime or lime and copperas, for the purpose of coagulating the suspended and colloidal impurities, and also when ingredients have been added to the water for the purpose of precipitating the solids therein and softening the water.

In most processes it is common to produce a degree of agitation of the liquid as it stands in a storage basin or flows through a basin. In the latter class of installations baffle plates are arranged around which the liquid flows while its velocity is being increased and its mass is being agitated. It has been found that the agitation produces collision of the colloidal particles of the liquid and that a proper degree of agitation will cause the particles to coagulate. It has also been found by experimentation that coagulation, with the resultant purification and clarification of the liquid, most efficiently takes place in liquids of different degrees of agitation for liquids varying in turbidity.

With these ideas in view, it is the principal object of the present invention to provide an apparatus for producing a desired agitation of a turbid liquid, which liquid has been previously treated with a coagulating agent, and which agitation will insure that a maximum coagulation will be brought about by the use of a minimum amount of coagulant.

The present invention contemplates the use of basins, through which a turbid liquid may be caused to flow, and within which basins the liquid will be agitated in a manner to insure maximum collision of the colloidal particles of the liquid, without disturbing the coagulated particles, and thereby insuring that coagulation of the impure matter will be rapidly accomplished.

The invention is illustrated by way of example in the accompanying drawings, in which:

Fig. 1 is a diagrammatical view in plan showing the arrangement of basins for carrying out the present invention.

Fig. 2 is a diagrammatical view in vertical section showing the arrangement of the basins and the manner in which they communicate.

Referring more particularly to the drawings, 10 indicates an inflow pipe through which previously treated water is delivered to a basin 11. It will be understood that this water has been previously treated with a calculated amount of coagulating agent such as alum, lime, or lime and copperas. The liquid thus treated is then led to the first basin 11, where it is allowed to flow through the basin, passing out from the basin, and being conducted to another basin by a pipe 12.

The second basin is indicated at 13 and is similar in construction to the first basin 11. A connecting pipe 14 conducts the liquid from the bottom of the second basin to the top of the third basin 15, after which the liquid may flow out through an overflow pipe 16. Sludge valves 17 are fitted at the bottom of each of the basins 11, 13 and 15, and are provided to permit the sludge and accumulated solids to be drawn from the cone-shaped bottoms of the basin. It is desirable to agitate this liquid, and in the prior installations the length of travel of the fluid is increased by the use of staggered baffle plates in the basin, which not only increase this travel, but the velocity of the liquid.

This construction, while resulting in an agitation, does not appear to give the most desirable agitation, and for that reason in the present instance mechanical agitating means are provided for producing this result. In practice I have found that the liquid in the basin must be given an even, swirling motion with an absence of violent eddy currents throughout the basin, and to maintain the motion at a uniform velocity. This velocity bears an indirect ratio to the turbidity of the liquid in bringing about efficient operation of the apparatus. Especially is this so when the agitating means impart a slow, swirling motion to the liquid, without violent agitation or ebullition of the liquid. The peculiar movement obtained by the present device has proven that it is possible to obtain a maximum collision force between the particles in suspension in the liquid and to at the same time prevent agitation which would be of sufficient violence to disrupt the coagulated particles in suspension.

The agitating structure in the present instance is a pair of paddles 17 which extend with their plane faces vertical and radially of the basins. These paddles bear a ratio in area of approximately one to four to the area of the basin. The paddles are mounted upon vertical shafts 18 which are driven by a drive shaft 19 through suitable gearing 20. It is desired to provide means to variably drive the paddles so that the apparatus may be used in efficiently treating waters of various turbidity. When the turbidity of the liquid is great it is necessary to produce a very slow velocity in the basins, while when the liquids are quite clear a relatively high velocity must be produced to obtain the proper clarification and purification of the liquid.

In practice the structure is designed to produce a velocity up to three feet per second, and it may at some time be desirable to reduce this velocity to .02 feet per second. In fact, the different basins of the apparatus may be best operated when different velocities are produced in the various basins, these velocities decreasing as the coagulation progresses.

In operation of the present invention the basins are connected as shown in the drawings, and the agitating mechanism adjusted and geared with special reference to the turbidity of the liquid to be treated. The liquid previously treated with a coagulant is then delivered to the basin 11, and here it may be swirled at a velocity of two or three feet per second. This velocity may be gradually reduced in the basins through which the liquid then flows, the reduction being in proportion to the increase in coagulating effect in the several basins. As the liquid flows through the various basins, coagulation will take place, after which the liquid may be suitably conducted to sedimentation basins.

It will thus be seen that by the method and apparatus here disclosed it is possible to build a liquid purification apparatus which is more flexible in operation than the usual installation and which at the same time may be readily cleaned and adapted to handle waters varying in their physical characteristics, and to insure that a maximum coagulation and subsequent sedimentation may be brought about by the use of a minimum amount of coagulant.

While I have shown the preferred method of carrying out the present invention and apparatus therefor, it will be understood that various changes might be made in the combination, construction and arrangement of parts by those skilled in the art, without departing from the spirit of the invention as claimed.

Having thus described my invention, what I claim and desire to secure by Letters Patent is:

1. A process of separating colloids from turbid water or other liquids, which consists in treating the solution with a coagulant, and thereafter agitating the solution for certain periods successively at different speeds.

2. A process of separating colloids from solution, which consists in treating the solution with a coagulant, and thereafter agitating the solution for certain periods by evenly swirling the same successively at different speeds.

3. A process of separating colloids from solution, which consists in treating the solution with a coagulant, and thereafter agitating the solution for certain periods successively at different velocity, which velocity bears direct ratio to the turbidity of the solution.

4. A process of clarifying a turbid water or liquid by separating the suspended colloidal substances from the solution, which consists in treating the solution with a coagulant, thereafter agitating the solution for certain periods by evenly swirling the same without producing violent agitation or ebullition of the solution, the velocity of the swirling movement during the periods of agitation being in indirect ratio to the turbidity of the solution.

5. A process of separating colloids from solution, which consist in treating the solution with a coagulant, thereafter agitating the solution for a period prolonged beyond that necessary to secure complete dissolution and mixing of the coagulant with the water, the velocity of the agitation being in indirect ratio to the turbidity of the liquid.

WILFRED F. LANGELIER.